United States Patent Office 3,172,189
Patented Mar. 9, 1965

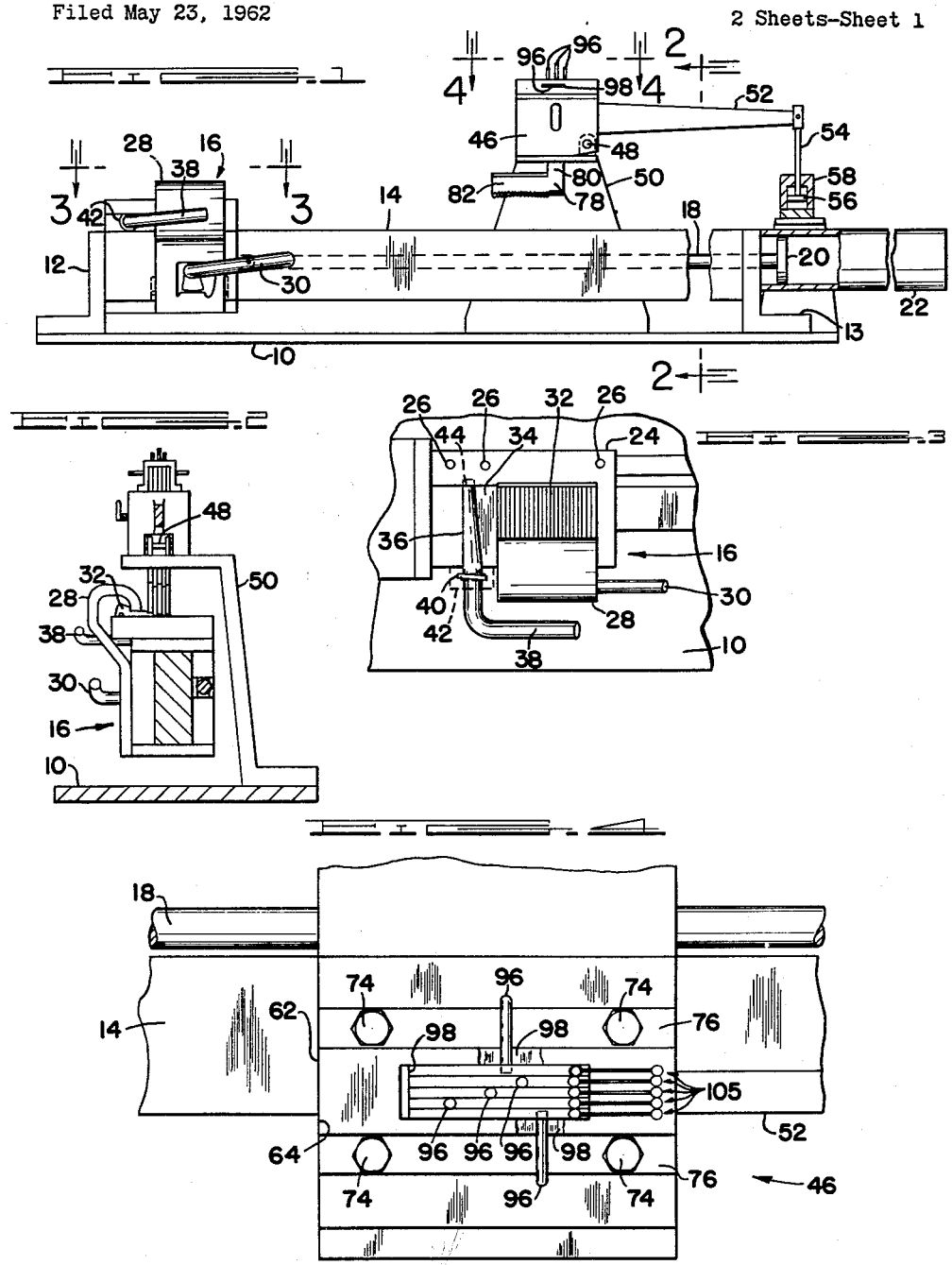

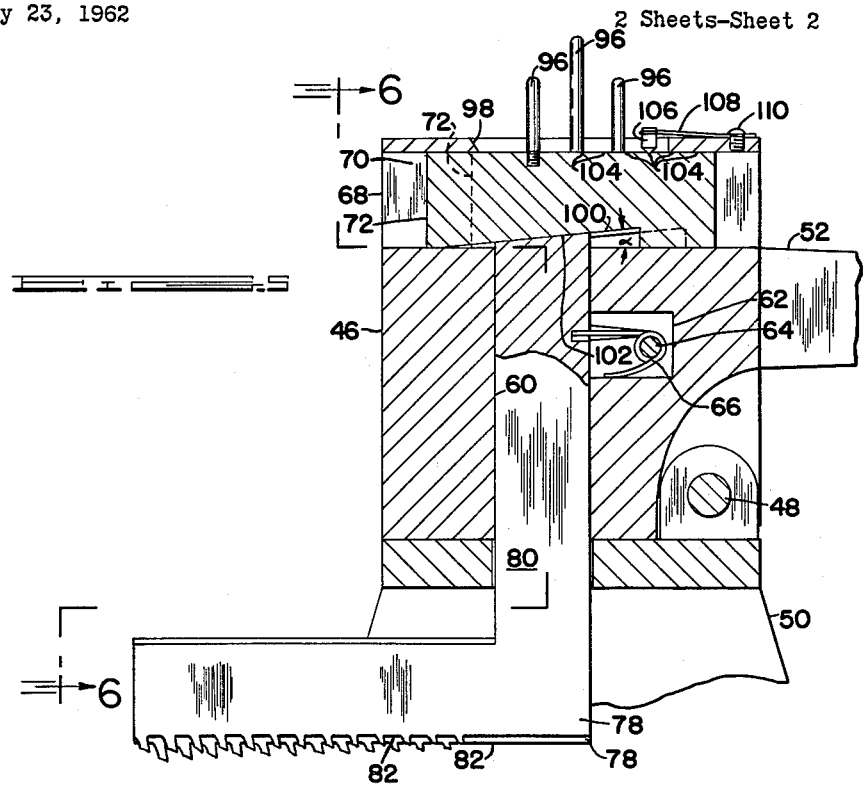
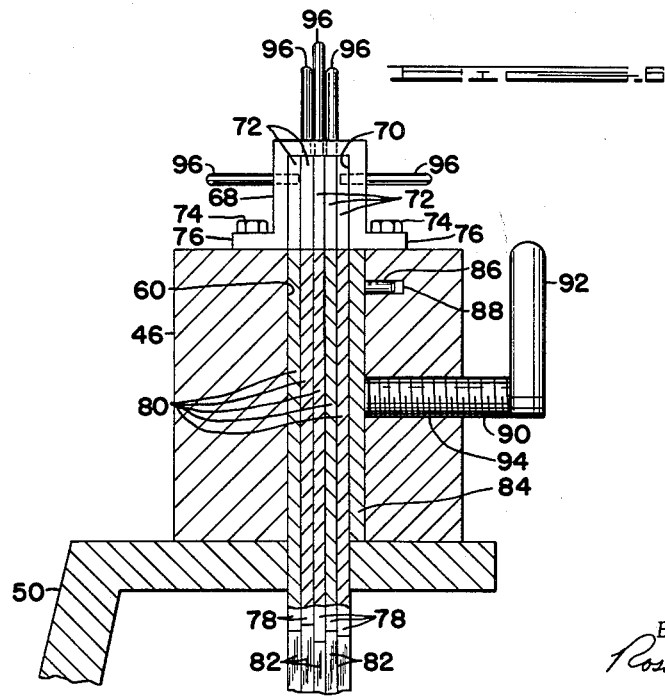

3,172,189
ADJUSTABLE BROACHING TOOL
Elwood F. Jewell, Adrian, Mich.
(Box 274, R.R. 1, Kalkaska, Mich.)
Filed May 23, 1962, Ser. No. 196,958
7 Claims. (Cl. 29—95.1)

This invention relates to an adjustable broaching tool.

An object of the present invention is to provide broaching apparatus having improved means for adjusting the height of the teeth of a broach with respect to a workpiece.

Another object of the invention is to provide a broach of novel configuration adapted for delicate adjustment with respect to a workpiece by movement of a slide, arranged in sliding contact with a portion of said broach.

A further object of the invention is to provide a broach having a shank arranged at an angle to a toothed portion thereof and adapted to be adjustably retained within a channel in a broach head.

Still a further object of the invention is to provide a broach having a shank disposed at an angle to a toothed portion thereof and slidably retained within a channeled head for adjustment of said toothed portion with respect to a workpiece in proportional response to movement of adjusting means supported by said head.

Still a further object of the invention is to provide a pivotable broach head arranged to dispose the toothed portion of a broach for contact with a workpiece when said head and workpiece are in motion relative to each other in one direction and to remove said toothed portion from disposition for contact with said workpiece when said head and workpiece are in motion relative to each other in an opposite direction.

Still a further object of the invention is to provide improved clamping means for retaining a plurality of work blanks in a work carrier adapted to operatively present said blanks to a broach.

These, together with various auxiliary features and objects of the invention which will later become apparent as the following description proceeds, are attained by the present invention, a preferred embodiment of which has been illustrated, by way of example only, in the accompanying drawings, forming a part of this specification, in which like characters are employed to designate like parts throughout the same, and wherein:

FIGURE 1 is a side view partly in section of an improved broaching apparatus.

FIGURE 2 is a view taken along line 2—2 of FIGURE 1.

FIGURE 3 is a plan view of a work carrier taken along line 3—3 of FIGURE 1.

FIGURE 4 is a plan view of a broach head taken along line 4—4 of FIGURE 1.

FIGURE 5 is a side view in section of a broach and broach head.

FIGURE 6 is a view taken along line 5—5 of FIGURE 4.

Referring now more particularly to the drawings, FIGURE 1 discloses a base 10 on which are mounted a pair of spaced, opposed brackets 12 and 13 supporting therebetween a rectangular guide bar 14. A work carrier generally indicated at 16 slidably surrounds bar 14 and is connected to a push rod 18 disposed in spaced parallel relation to bar 14. The other end of push rod 18 is connected to a piston 20 slidably received within a cylinder 22 mounted on bracket 13. Cylinder 22 is of a conventional type adapted to effect reciprocation of piston 20 and push rod 18 by the introduction of pressurized air or other fluid into the cylinder alternately on each side of the piston and the simultaneous exhaustion of such air or other fluid from the cylinder on the opposing side of the piston, through conventional valve means (not shown) in response to conventional control means (not shown). When functioning of cylinder 22 causes piston 20 to be moved in a direction away from bracket 12, work carrier 16, being connected to the piston by rod 18, is drawn in such direction; when functioning of the cylinder causes piston 20 to be moved toward bracket 12, work carrier 16 is pushed in such other direction by rod 18 and the piston.

An L-shaped fixture 24 is secured by conventional means such as bolts 26 or the like to the top of carrier 16 to form a stop. A hooklike clamping member 28 is slidably connected to one side of carrier 16 by a clamping handle 30, threadably engaged with the carrier, in opposition to the longer side of fixture 24, and adapted to clamp downwardly against a workpiece 32, such as a plurality of key blanks, placed atop carrier 16 and against the inner surfaces of fixture 24. Workpiece 32 is restrained from rearward movement by a wedge 34 forced tightly against the rear of the workpiece by a camlike sloping shaft 36 terminating at one end in a clamp handle 38 and threadably engaged by a single thread 40 within a housing 42 and rotatably engaged at the opposite end within a recess 44 in fixture 24.

To insert and securely grip workpiece 32 in work carrier 16, clamp 28 is loosened and the workpiece is placed atop carrier 16 and aligned against the inner surfaces of fixture 24. Wedge 34 is then forced by shaft 36 against workpiece 32 from the rear by manual clockwise rotation of clamp handle 38. Clamp 28 is then pressed downward against the top of workpiece 32 and there retained by manually tightening clamping handle 30.

A steel control head 46 is pivotally connected by a pin 48 to the flat, horizontal top of a support bracket 50 attached to the upper surface of base 10 intermediate brackets 12 and 13. An arm 52 is attached at one end by welding or the like to the rear of head 46, the other end of the arm being pivotally connected to a vertically disposed rod 54 connected to a piston 56 slidably retained within a second cylinder 58. Cylinder 58 is operatively connected with cylinder 22 by conventional conduit means (not shown) so that when air or other fluid introduced into cylinder 22 causes work carrier 16 to be drawn in a direction away from bracket 12, piston 56 is moved downwardly within cylinder 58 and draws rod 54 downward, rotating arm 52 downwardly about pin 48 and causing head 46 to be rotated upwardly about the pin. When reverse action of cylinder 22 causes piston 20, rod 18, and carrier 16 to move in the direction of bracket 12, piston 56 is caused to move upwardly within cylinder 58, raising rod 54, causing arm 52 to be rotated upwardly about pin 48, and causing head 46 to be rotated downwardly about the pin to rest against the flat, horizontal top of bracket 50, in which position it is firmly held in place by the pressure within cylinder 58.

A vertical channel 60 is machined in head 46 and extends through the top and bottom thereof. A horizontal channel 62 is formed in the rear wall of channel 60 and extends the entire width of channel 60. A horizontal pin 64 is disposed within channel 62, the ends of the pin being retained within the sides of head 46 flanking the ends of the channel, to retain a plurality of loop springs 66 for a purpose more particularly hereinafter described. A housing 68, having a rectangular channel 70 therein closed at each end and of width equal to that of channel 60 and adapted to receive a plurality of slides 72 more particularly hereinafter described, is secured to the top of head 46 by a plurality of bolts 74 or the like extending downwardly into the head through a pair of external flanges 76, 76.

I provide a plurality of preferably five multiple-tooth broaches 78 of unique configuration, each having a shank 80 forming a right angle with the toothed portion 82 thereof. Shank 80 of each broach, and channel 60, are formed so that the shanks will each be disposed for vertical sliding when placed side to side in movement with respect to each other and to head 46 when they are placed side by side in an array within channel 60. To retain shanks 80 at any preselected arrangement of vertical positions within channel 60, a pressure plate 84 is provided at one side of the channel and supported by at least one dowel 86 slidingly retained within a bore 88 in one side of head 46. Plate 84 is adapted to be clamped against the outer surface of an outer broach in the array by a clamping screw 90 bearing a handle 92 and threadably engaged within an aperture 94 extending through such side of the head. Clockwise rotation of handle 92 causes screw 90 to contact plate 84 and force it against the side of the array of shanks 80, thus pressing the shanks against each other and the opposing wall of channel 60 and clamping them securely within the head 46. The teeth of each toothed portion 82 of each broach 78 are arranged in conventional shape and order to perform roughing, chamfering, finishing, and topping operations upon bracket 50 and the workpiece is brought into passing contact with the teeth by movement of carrier 16 toward bracket 12 as hereinabove described. Further, I arrange the teeth of each broach 78 in staggered relationship to those of the other broaches in the array, for smoother cutting.

I provide novel means for effecting delicate adjustment of the height of toothed portions 82 of broaches 78. A small bore 94 is drilled in the rear surface of the shank 80 of each broach 78 to receive one end of one of springs 66, respectively, extending into said bore from channel 62. The other end of each spring 66 is formed to have a somewhat shorter length, so as not to extend outward, and rests against the lower wall of channel 62. Springs 66 thus yieldingly urge the shanks 80 of broaches 78 upwardly within the channel 60 and toothed portions 82 to a position of maximum elevation. A slide 72 is provided for each broach 78 and arranged for horizontal sliding movement within channel 70, as hereinbefore described, by manual movement of handles 96 connected to each slide and extending outward of housing 68 through apertures 98 provided in the housing for such purpose. The central portion 100 of the lower edge of each slide 72 is plane and sloped upwardly and rearwardly at an angle $\alpha$ to the common horizontal longitudinal axes of the slide and of channel 70, and the upper surface of end 102 of shank 80 each broach 78 is also formed to be plane and sloped at an identical angle to said axes so that the entire upper surface of end 102 will be disposed in sliding contact with portion 100 of slide 72 under upward urging of spring 66. Horizontal sliding movement of slide 72 one unit of distance will, by sliding contact of portion 100 and end 102, effect vertical sliding movement of shank 80 and hence of toothed portion 82 a distance equal to the tangent of the angle $\alpha$, when shank 80 is not clamped by plate 84 and hence free to move. Thus when screw 90 is loosened, releasing pressure of plate 84 upon shanks 80, horizontal rearward movement of a slide 72 within channel 70 one unit of distance will cause shank 80, the end 102 of which is in contact with portion 100 of the slide, to move downward within channel 60 against the upward pressure of spring 66 a distance equal to the distance of such rearward movement of the slide multiplied by the tangent of angle $\alpha$. Similarly, horizontal forward movement of slide 72 one unit of distance will permit spring 66 to elevate shank 80 within channel 60 a distance equal to the distance of such forward movement of the slide multiplied by the tangent of the angle $\alpha$. By selecting an angle $\alpha$ of small angular magnitude, any desired degree of accuracy of elevation of toothed portion 82 may be obtained for each broach 78 and the depth of the cut to be made by each broach in workpiece 32 thereby precisely controlled.

For example, in the bitting of keys it is customary to form a plurality of five notches of heights varying by increments of 20 thousandths of an inch or multiples thereof. If angle $\alpha$ be formed to have 5 degrees 42 minutes 38 seconds of arc, the tangent thereof will be approximately .100 and a change of approximately 20 thousandths of an inch of elevation of toothed portion 82 will result from horizontal movement of slide 72 a distance of .200 inch.

I provide as indexes a plurality of parallel notches 104 in the upper surface of each slide 72 and spaced a precise and uniform distance from each other such that horizontal movement thereof such distance will effect the minimum desired increment of change of elevation of toothed portion 82 of the associated broach 80. I also provide for each slide 72 a detent assembly generally indicated at 105 and including a detent 106 connected to one end of and yieldingly urged by a leaf spring 108 to engage notches 104, the other end of the spring being connected to the top of housing 68 by a screw 110 or the like.

In operation, a workpiece 32, such as a plurality of key blanks, is secured atop work carrier 16 as hereinbefore described. Handles 96 are then moved forward or rearward until each detent 106 engages the correct notch 104 in the upper surface of the slide to which the handle is connected, to raise or lower to the desired elevation the toothed portion 82 of the broach 78 with which the slide cooperates. Handle 92 is then manually tightened, forcing plate 84 against shanks 80 and clamping the shanks against the opposing wall of channel 60.

Compressed air or fluid under pressure is then allowed to enter cylinder 22 to move piston 20 in a direction away from bracket 12, drawing rod 18 and carrier 16 along guide bar 14; simultaneously, air or such fluid enters cylinder 58 to move piston 56 downward, thus rotating control head 46 bearing broaches 78 upward about pin 48 to permit carrier 16 and workpiece 32 to pass therebelow. Compressed air or fluid under the pressure is then allowed to enter cylinders 22 and 58 on the other sides of pistons 20 and 56, respectively, moving the cylinders in reverse direction in the conventional manner and thereby forcing rod 18 and carrier 16 toward bracket 12 and rotating head 46 bearing broaches 78 downward. As head 46 is rotated downward, and firmly held in horizontal position against the flat upper surface of bracket 50, the toother portions 82 of broaches 80 are disposed in a horizontal position, each securely held by the head at the precise proper height with respect to the workpiece determined by the position of its cooperating slide 72.

As workpiece 32 passes under broaches 78, toothed portions 82 of each broach cut a groove of precise final depth in the workpiece in a single pass. Where the workpiece constitutes a plurality of key blanks, each of the blanks is thus bitted cleanly and identically, a separate notch having been cut by each broach 78 precisely to a predetermined depth, the depths of the several notches being arranged distances which are multiples of the conventional 20 thousandths of an inch. The finished workpiece is then removed from carrier 16 by rotating handle 30 to loosen clamp 28 and wedge 34.

It is to be understood that the form of the invention herewith shown and described is to be taken as a preferred embodiment of the same and that resort may be had to various changes in construction without departing from the scope of the invention or the subjoined claims.

What is claimed is:

1. In combination with a broach having a toothed portion and a shank arranged at an angle to said toothed portion, a head having a first channel therein adapted to slidably receive said shank and further having a second channel therein intersecting said first channel, and a slide slidably received for longitudinal movement within said second channel and having a sloped surface adapted to slidingly contact said shank and move said shank longitudinally within said first channel, to adjust the height of said toother portion with respect to said head, index means for indicating the horizontal position of said slide, a detent, and spring means yieldingly urging said detent to engage said index, to releasably retain said slide at a selected horizontal position within said second channel.

2. The device of claim 1 having spring means adapted to yieldingly urge said shank against said sloped surface of said slide, and means adapted to releasably clamp said shank at a selected position within said first channel.

3. In combination, a broach having a toothed portion and a shank disposed at an angle to said toothed portion, said shank having a sloped end, a head having a first channel therein adapted to slidably receive said shank and further having a second channel therein intersecting said first channel, a slide slidingly disposed within said second channel and having a sloped surface adapted to slidingly contact said sloped end of said shank, spring means yieldingly urging said shank against said slope surface of said slide, to move said shank longitudinally within said first channel a distance proportionate to the extent of movement of said slide when said slide is moved longitudinally within said second channel, means adapted to releasably clamp said shank at a desired position within said first channel, to adjust the height of said toothed portion with respect to said head and to releasably maintain said toothed portion at such height, index means for indicating the horizontal position of said slide, a detent, and spring means yieldingly urging said detent to engage said index, to releasably retain said slide at a selected horizontal position within said second channel.

4. The device of claim 3 having means for releasably clamping said slide at a desired position within said second channel.

5. In combination, a broach having a cutting portion and a shank disposed at a right angle to said cutting portion and having a sloped end distant from said cutting portion, a broach head having a first channel extending vertically downward therein and adapted to slidably receive said shank, one side of said channel being formed by a pressure plate movable transverse to the longitudinal axis of said channel, and a screw threadably engaged in an aperture extending through the side of said first channel proximate to said pressure plate and adapted to force said pressure plate against said shank and said shank against the opposing side of said first channel to releasably clamp said shank at a desired position within said first channel, said head further having a horizontal second channel intersecting said first channel at the top thereof, a slide slidingly disposed within said second channel and having a sloped lower surface adapted to slidingly contact the sloped end of said shank, spring means yieldingly urging said sloped end of said shank upwardly against said sloped surface of said slide, to effect downward movement of said shank within said first channel by horizontal movement of said slide in one direction, and upward movement of said shank within said first channel by horizontal movement of said shank in an opposite direction, to adjust and maintain the height of said cutting portion with respect to said head, index means for indicating the horizontal position of said slide, a detent, and spring means yieldingly urging said detent to engage said index, to releasably retain said slide at a selected horizontal position within said second channel.

6. The device of claim 5 wherein said pressure plate is slidably supported by at least one dowel extending into a bore in said side of said head proximate to said pressure plate.

7. The device of claim 5 wherein said spring means comprises a spring retained within a third channel in said head, an end of said spring extending into a bore in said shank.

References Cited by the Examiner

UNITED STATES PATENTS

| | | | |
|---|---|---|---|
| 807,174 | 12/05 | Jones | 29—95.1 |
| 1,210,544 | 1/17 | Schmidt | 29—95.1 |
| 1,835,958 | 12/31 | Luers | 29—97 |
| 2,539,878 | 1/51 | Walter | 90—55 |
| 2,770,028 | 11/56 | Bonnafe | 29—95.1 |
| 2,853,135 | 9/58 | Solenberger | 29—97 |
| 2,947,226 | 8/60 | Walter | 90—55 |
| 2,952,191 | 9/60 | Cornelius | 29—95.1 |
| 2,998,634 | 9/61 | Raehrs et al. | 29—95.1 |

FOREIGN PATENTS

| | | |
|---|---|---|
| 978,781 | 11/50 | France. |
| 411,912 | 4/25 | Germany. |

WILLIAM W. DYER, Jr., *Primary Examiner.*